(12) United States Patent
Rigney

(10) Patent No.: US 6,640,486 B1
(45) Date of Patent: Nov. 4, 2003

(54) INVERTED FISH HOOK

(76) Inventor: Jan Jay Rigney, Route 6, Box 11, Claremore, OK (US) 74018

( * ) Notice: Subject to any disclaimer, the term of this patent is extended or adjusted under 35 U.S.C. 154(b) by 59 days.

(21) Appl. No.: 09/713,480

(22) Filed: Nov. 15, 2000

Related U.S. Application Data

(63) Continuation of application No. 08/924,275, filed on Sep. 5, 1997, now abandoned.

(51) Int. Cl.$^7$ .............................................. A01K 83/06
(52) U.S. Cl. .................................................... 43/42.37
(58) Field of Search ........................ 43/4, 43.14, 42.39, 43/44.81, 42.37

(56) References Cited

U.S. PATENT DOCUMENTS

| | | | | |
|---|---|---|---|---|
| 77,774 A | * | 5/1868 | Smith | 43/43.14 |
| 497,962 A | * | 5/1893 | D'ivernois | 43/44.81 |
| 1,103,707 A | * | 7/1914 | Threm | 43/44.81 |
| 1,295,370 A | * | 2/1919 | Porter | 43/44.81 |
| 2,016,960 A | * | 10/1935 | Dillon | 43/42.1 |
| 2,765,572 A | * | 10/1956 | Woolfe | 43/42.37 |
| 2,787,858 A | * | 4/1957 | Best | 43/43.15 |
| 2,792,663 A | * | 5/1957 | Sinclair | 43/43.15 |
| 2,989,817 A | * | 6/1961 | Kepler | 43/42.39 |
| 2,994,982 A | * | 9/1961 | Murawski | 43/35 |
| 3,883,979 A | * | 5/1975 | Williams, Jr. | 43/42.09 |
| 4,713,907 A | * | 12/1987 | Dudeck | 43/42.39 |
| 4,794,720 A | * | 1/1989 | Robertaccio | 43/42 |
| 4,843,754 A | * | 7/1989 | Spelts | 43/42.1 |
| 5,649,384 A | * | 7/1997 | Manning | 43/44.81 |

* cited by examiner

Primary Examiner—Charles T. Jordan
Assistant Examiner—Jordan Lofdahl

(57) ABSTRACT

A hook having a shank with an eye at one end and a bent portion culminating in a point at the other end and having a specific gravity greater than the specific gravity of water is combined with a buoyant body mounted on the hook and means connected to the hook which, in cooperation with the buoyant body, causes the point of the hook to float above the eye of the hook in the water. In one embodiment, the cooperating means is a weight mounted on the hook or made integrally as part of the hook and located between the eye of the hook and the buoyant body so as to cause the eye to orient below the buoyant body. In another embodiment, the cooperating means is a plug to which the eye is pivotally connected to provide a point about which the buoyant body will cause the hook to rotate and thus orient the point of the hook above the eye. In an alternate to the latter embodiment, the pivotal connection can be arranged so that the point of the hook is directed toward the rear of the plug.

6 Claims, 4 Drawing Sheets

INVERTED FISH HOOK

This application is a continuation of application Ser. No. 08/924,275 filed on Sep. 5, 1997 now abandoned.

BACKGROUND OF THE INVENTION

This invention relates generally to fishing equipment and more particularly concerns hooks used for fishing.

Hooks are presented to fish in a variety of ways. They may be dropped, suspended, vertically jigged, retrieved or trolled. In each of these methods, the fish hook tends to hang up in branches, grass, weeds, rocks, sticks and other underwater objects and debris. This generally decreases the angler's fishing time and frequently results in the loss of the bait or lure being used. A variety of apparata have been devised to minimize hangups, such as weed guards and baits which protect or shield the tip of the hook from engagement with the underwater objects and debris. Such devices also reduce the possibility of properly hooking the fish. Apparata have also been devised which are attachable to the fishing line and will slide down the line to disengage a hook that is hung up. These apparata are also costly and time consuming.

It is, therefore, a primary object of this invention to provide a fish hook which can be used with its tip in an exposed or unobstructed condition in order to facilitate hooking the fish but oriented in a manner to prevent hanging up or snagging on underwater objects and debris. A further object of this invention is to provide a fish hook which assumes and maintains an inverted position in the water so as to minimize the possibility of hangups during retrieval. Another object of this invention is to provide a fish hook oriented and positioned to simulate the pectoral and abdominal fins of a fish. It is also an object of this invention to provide a fish hook that will undulate and move up, down, back and forth to simulate the natural movements of pectoral and abdominal fins of a fish.

SUMMARY OF THE INVENTION

In accordance with the invention, a hook having a shank with an eye at one end and a bent portion culminating in a point at the other end and having a specific gravity greater than the specific gravity of water is combined with a buoyant body mounted on the hook and means connected to the hook which, in cooperation with the buoyant body, causes the point of the hook to float above the eye of the hook in the water in an orientation such that the open gap of the hook does not encounter or engage objects or debris in the water. Rather, the back of the gap of the hook is oriented to encounter such obstacles, thus preventing hang-ups.

In one embodiment, the cooperating means is a weight mounted on the hook or made integrally as part of the hook and located between the eye of the hook and the buoyant body so as to cause the eye to orient below the buoyant body when the hook is in the water. In the weighted embodiment, the center of gravity of the buoyant body is on the point side of the hook in relation to the center of gravity of the hook. The buoyant body may be a flexible sleeve which snugly slides on the shank and/or the curved portion of the hook. The external contour of the sleeve may simulate a live bait or a portion of a live bait.

In another embodiment, the cooperating means is a plug to which the eye is pivotally connected to provide a point about which the buoyant body will cause the hook to rotate and thus orient the tip of the hook above the eye when the hook is disposed in the water. In the plug embodiment, the buoyant body is preferably a sleeve mounted on the shank of the hook.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
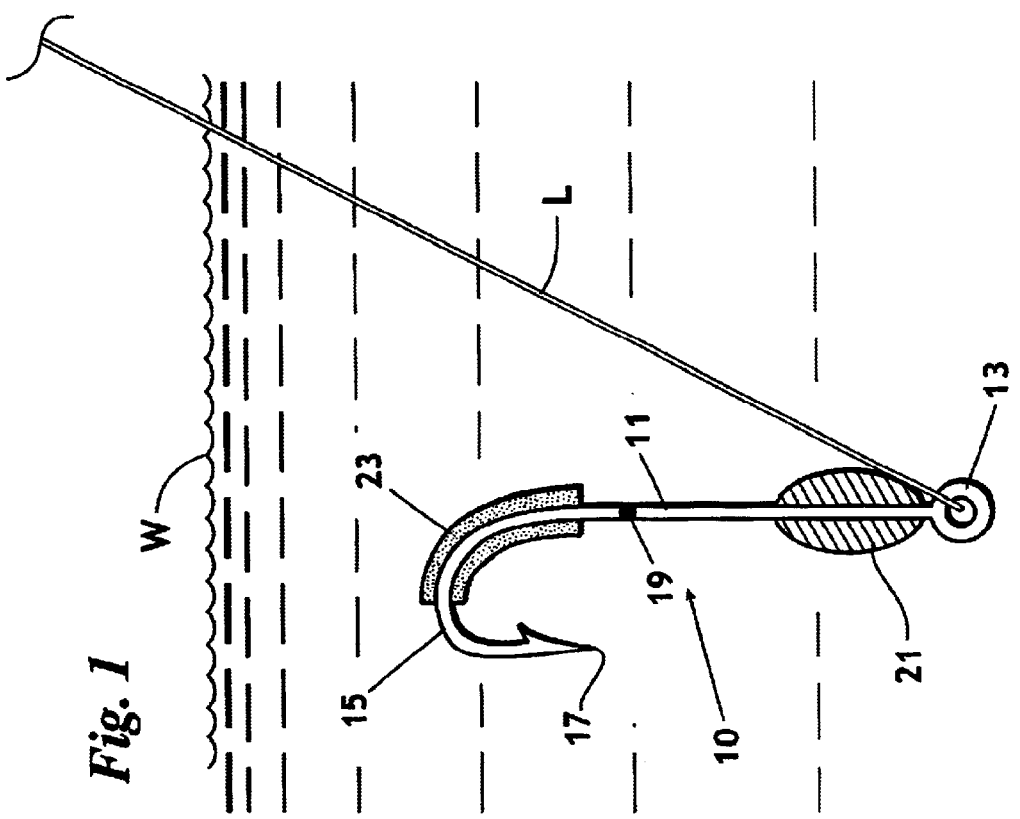
FIG. 1 is a cross-sectional view of a weighted embodiment of the inverted fish hook with a sleeve type buoyant body.

Turning first to FIG. 1, a fish hook 10 having a shank 11 with an eye 13 at one end and a curved portion 15 culminating in a point 17 at the other end has a center of gravity 19. The hook 10 has a specific gravity greater than that of water and will sink in the water W unless a counterbalancing or retrieval force is applied to the hook 10 through the fishing line L which is connected to the eye 13. The hook 10 is maintained in an inverted position in the water W with the point 17 above the eye 13 by cooperation of a weight 21 having a specific gravity greater than that of water disposed at or near the eye end of the hook 10 and a buoyant body 23 mounted at or proximate the curve 15 of the hook 10. As shown, the buoyant body 23 is a sleeve which is snugly slidable on the shank 11 and/or the curved portion 15 of the hook 10 and the weight 21 is attached to or mounted on the shank 11 of the hook 10. However, the weight 21 may be integrally formed with or a part of the shank 11 or of the eye 13. It is also preferred that the weight 21 is disposed between the eye 13 and the center of gravity 19 of the hook 10 and that the buoyant body 23 is mounted on the opposite side of the center of gravity 19 of the hook 10, but this is not necessary as long as the weight 21 and buoyant body 23 are coordinated to assure that the center of gravity of the combination is closer to the eye 13 than to the curved portion 15 of the hook 10.

Figure 2:
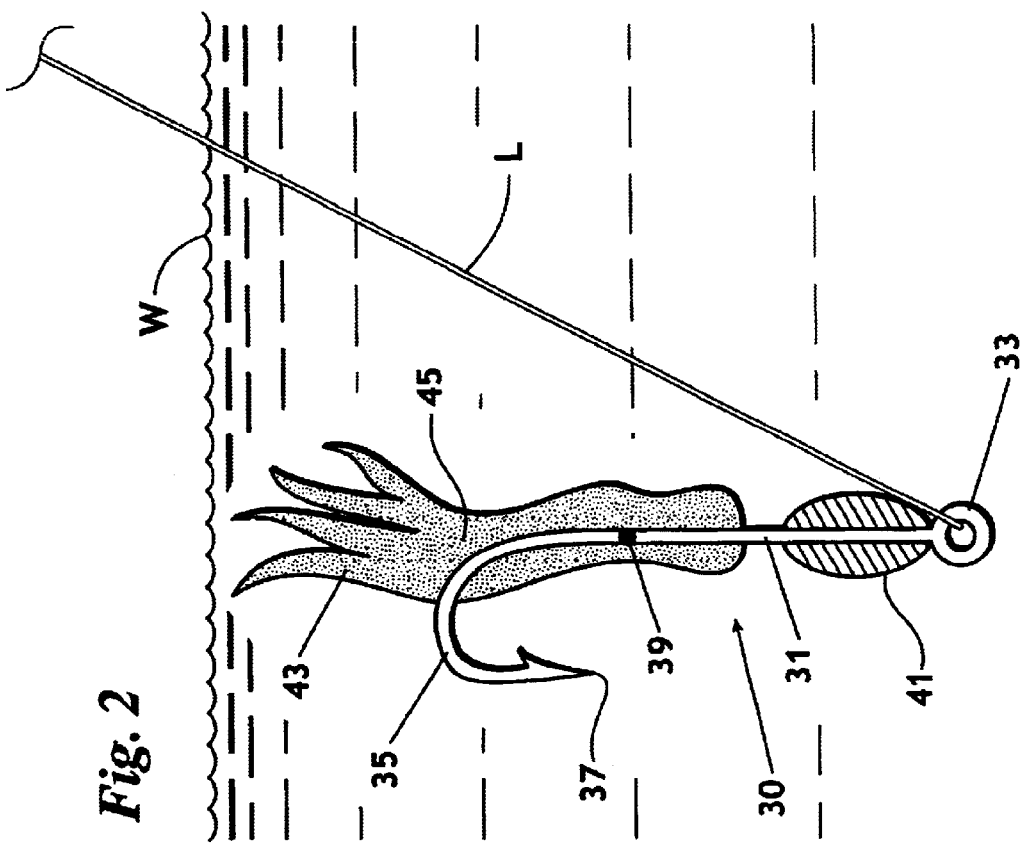
FIG. 2 is an elevation view of a weighted embodiment of the inverted fish hook with a simulated live bait-type buoyant body.

Turning now to FIG. 2, a hook 30 having a shank 31 with an eye 33 at one end and a curved portion 35 culminating in a point 37 at the other end has a center of gravity 39. A weight 41 mounted on the shank 31 proximate the eye 33 of the hook 30 lies between the eye 33 and the center of gravity 39 of the hook 30. The buoyant body 43 has an outer contour which simulates the shape of a live bait and is slidably mounted on the hook 30 such that its center of gravity 45 is on the opposite side of the center of gravity 39 of the hook 30 than the weight 41. While a portion of the buoyant body 43 extends over the weighted side of the center of gravity 39 of the hook 30, the location of the center of gravity of the weight 41 and the buoyant body 43 on opposite sides of the center of gravity 39 of the hook 30 causes the hook 30 to orient in an inverted condition in the water W. even if a force is applied through the line L to the eye 33 of the hook 30. Even if the force is sufficient to flip the hook 30, it will quickly revert to its inverted condition.

Figure 3:
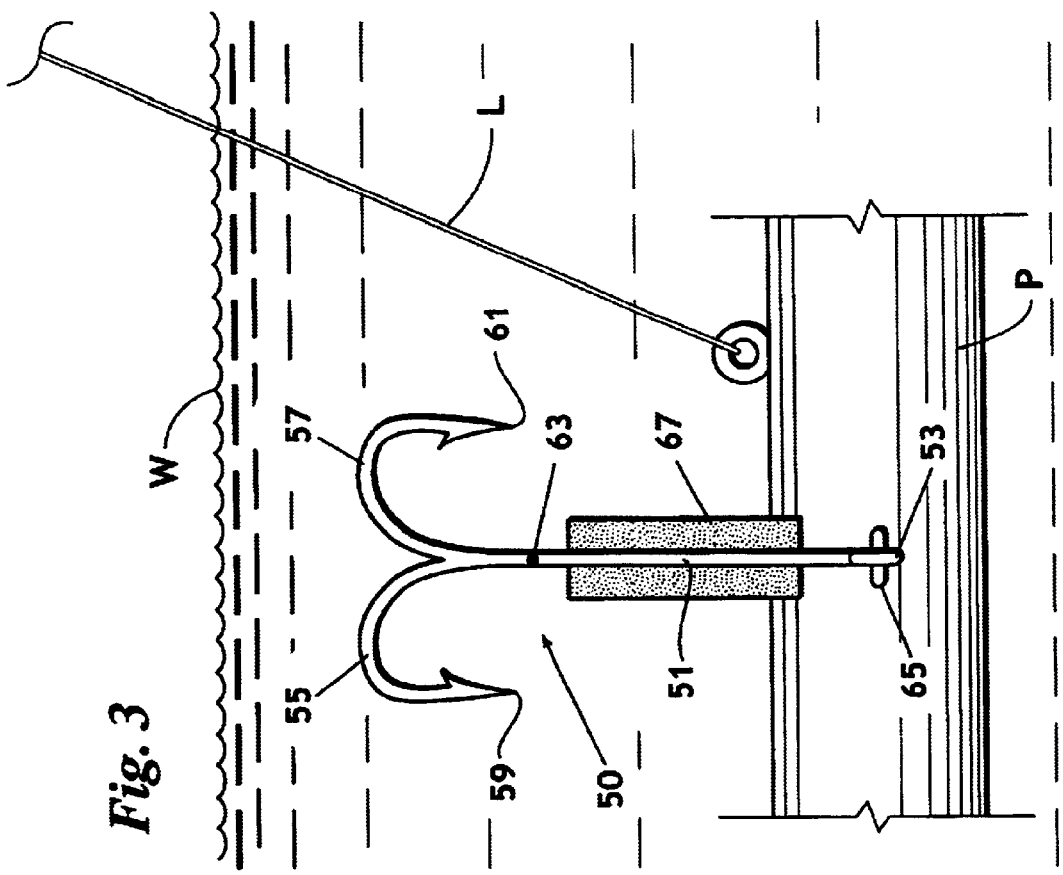
FIG. 3 is an elevation view of a plug embodiment of the inverted fish hook.
Figure 4:
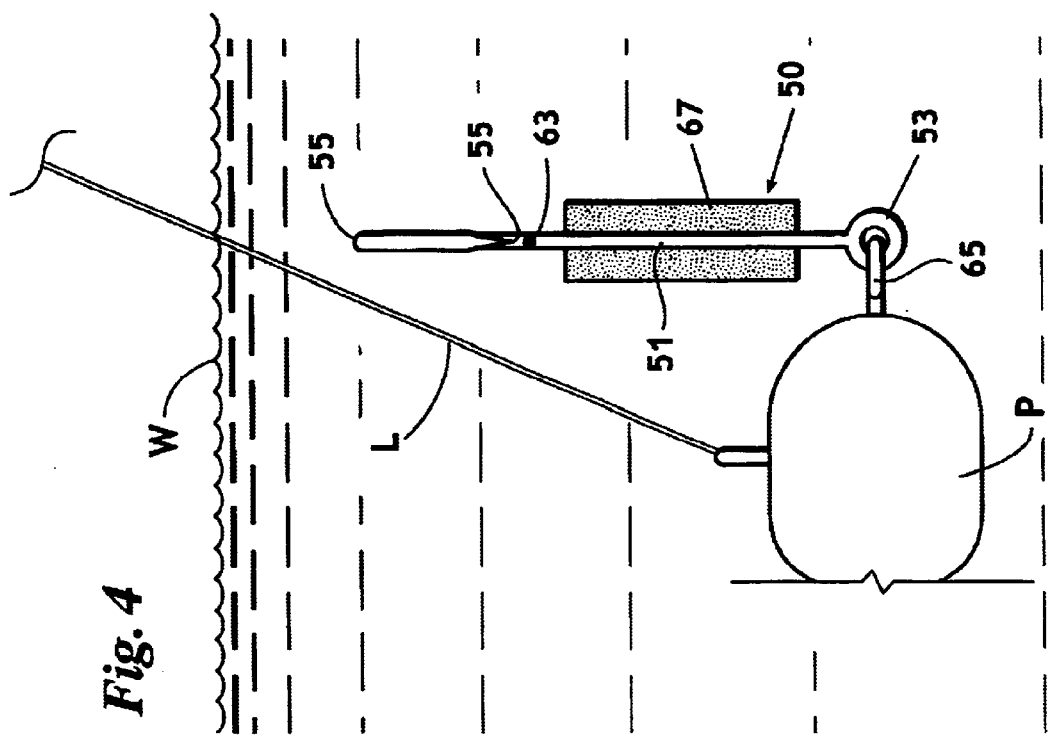
FIG. 4 is an end view of the plug embodiment of FIG. 3.

Looking at FIGS. 3 and 4, a hook 50 having a shank 51 with an eye 53 at one end and two curved portions 55 and 57 culminating in points 59 and 61 at the other end has a center of gravity 63. The eye 53 of the hook 50 is pivotally connected to a plug P, such as by engagement in another eye 65 on the plug P. A buoyant body 67 is slidably mounted on the shank 51 of the hook 50, the buoyancy of the body 67 being such that it cooperates with the pivot engagement of the eye 53 on the plug P to cause the hook 50 to orient in an inverted condition in the water W. The lure L is connected to the plug P rather than the hook 50.

Figure 5:
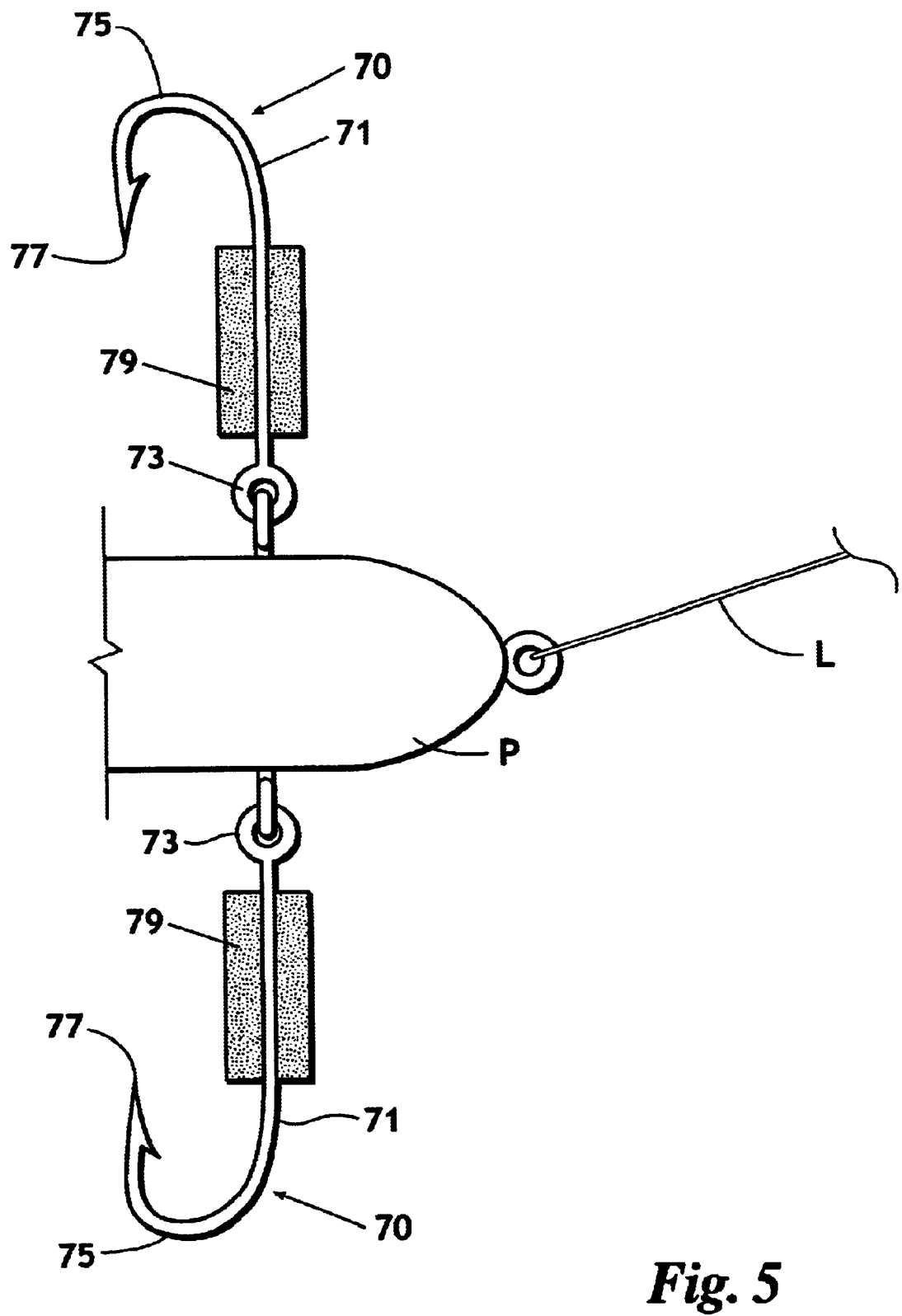
FIG. 5 is a top plan view of an alternative arrangement of the plug embodiment of the inverted fish hook.

Looking at FIG. 5, the hooks 70 may be pivotally connected to the plug P with the points 77 of the hooks 70 toward the rear of the plug P. Thus, when the plug P is drawn through the water by a force exerted in the line L attached to the front of the plug P, the buoyant bodies 79 will raise the point ends of the hooks 71 but the points 77 will be oriented toward the rear and the shanks 71 and curved portions 75 of the hooks 70 will encounter the objects and debris in the path of the plug P.

For the purposes of this description, the buoyant bodies 23, 43, 67 and 79 may be defined as sleeves in that they slidably snugly engage on the hooks 10, 30, 50 and 70. The sleeves may be formed with a permanent internal passageway or may be solid buoyant bodies having a passageway formed by penetration of the point of the hooks 10, 30, 50 or 70 through the bodies 23, 43, 67 or 79.

Figure 6:
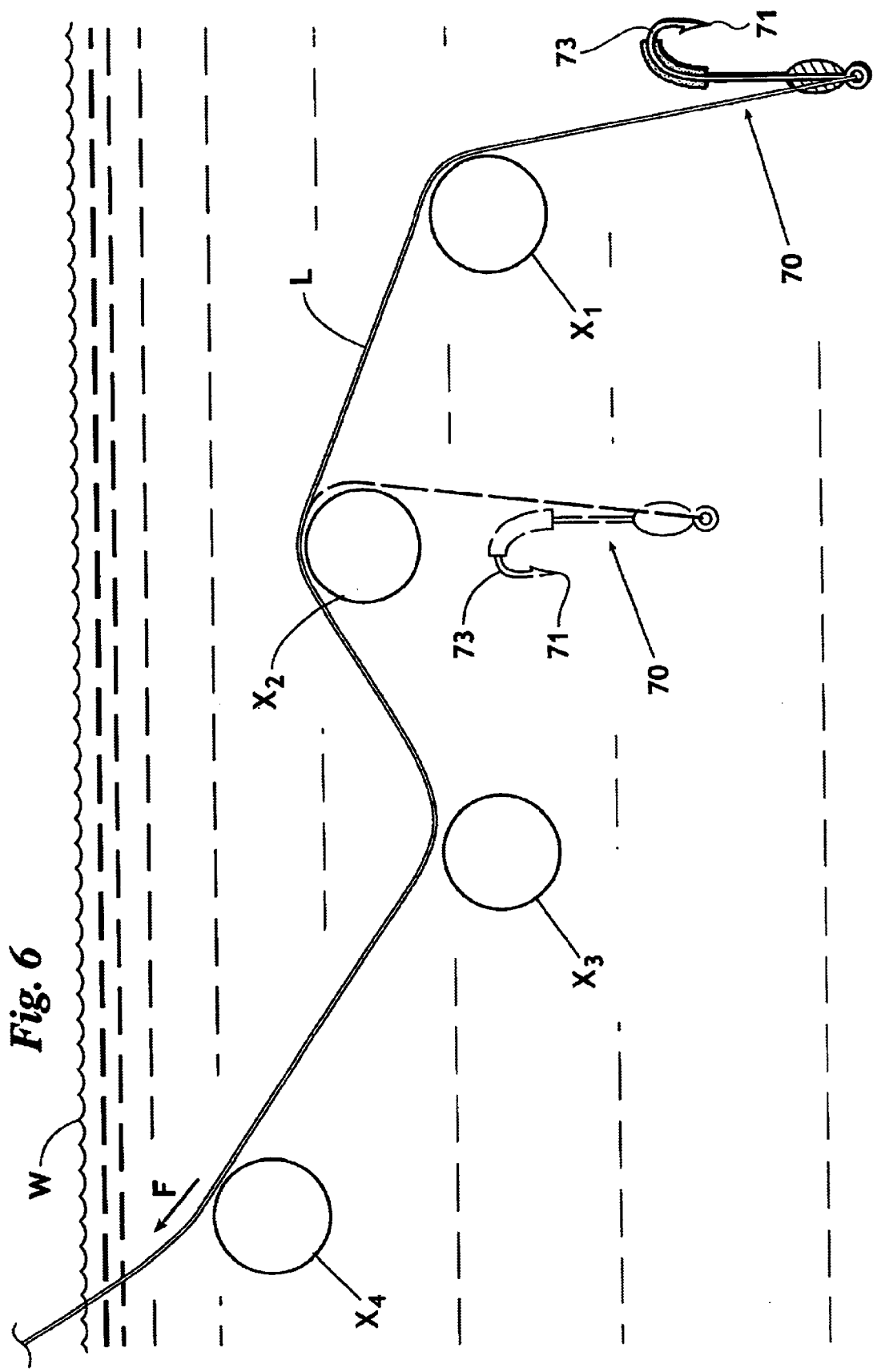
FIG. 6 is an elevation view illustrating a typical retrieval path pattern for an inverted fish hook through a maze of underwater objects and debris.

The operation of the inverted hook in the water W so as to prevent hang up on underwater objects and debris is illustrated in FIG. 6. Initially, the inverted hook 70 hangs down in its inverted condition from the line L over the last of a multitude of objects X over which the line L extends. When a retrieval force is applied in the direction of the arrow F on the line L, the hook 70 will be sequentially drawn toward the objects X over which the line L extends. Since the hook 70 is inverted, the point 71 is directed in a downward condition and the curved portion 73 of the hook 70 will encounter the objects X, permitting the hook 70 to be pulled over the objects X without engaging the point 71 with the object X. When the hook has cleared the first object $X_1$, it will drop below the next object $X_2$ in the sequence, remaining in the inverted condition. Then, as the retrieval force continues, the curved portion 73 of the hook 70 will make contact with the second object $X_2$, permitting the inverted hook 70 to pass over this object and fall below the next object $X_3$ in an inverted condition. The process continues until all of the objects X are cleared and the hook 70 is fully retrieved.

Thus, it is apparent that there has been provided, in accordance with the invention, an inverted fish hook that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A combination comprising a fishing hook having a shank with an eye at one end thereof, at least one bent portion culminating in a point at another end thereof and a specific gravity greater than the specific gravity of water, a buoyant body mounted on said hook and a weight disposed on said hook between said eye and said buoyant body, said weight being cooperable with said buoyant body to cause said point to float above said eye in the water with said shank vertically oriented.

2. A combination comprising a fishing hook having a shank with an eye at one end thereof, at least one bent portion culminating in a point at another end thereof and a specific gravity greater than the specific gravity of water and a buoyant body disposed on said hook with a center of gravity of said body being on a point side of said hook relative to a center of gravity of said hook whereby said hook orients in water with said point above said eye and said shank vertically oriented.

3. A combination according to claim 2, said buoyant body comprising a flexible sleeve snugly slidable on said shank.

4. A combination according to claim 3, said buoyant body having an outer shape simulating a live bait.

5. A combination according to claim 3, said buoyant body having an outer shape simulating a portion of a live bait.

6. A combination comprising a fishing hook having a shank with an eye at one end thereof, at least one bent portion culminating in a point at another end thereof and a specific gravity greater than the specific gravity of water, a buoyant sleeve mounted on said shank and a plug, said eye being pivotally connected to said plug whereby said hook orients in water with said point above said eye and said shank vertically oriented.

* * * * *